United States Patent
Kress et al.

(10) Patent No.: US 9,223,139 B2
(45) Date of Patent: Dec. 29, 2015

(54) CASCADING OPTICS IN OPTICAL COMBINERS OF HEAD MOUNTED DISPLAYS

(71) Applicant: Google Inc., Mountain View, CA (US)

(72) Inventors: Bernard Kress, Redwood City, CA (US); Thad E. Starner, Atlanta, GA (US)

(73) Assignee: Google Inc., Mountain View, CA (US)

(*) Notice: Subject to any disclaimer, the term of this patent is extended or adjusted under 35 U.S.C. 154(b) by 293 days.

(21) Appl. No.: 13/769,191

(22) Filed: Feb. 15, 2013

(65) Prior Publication Data

US 2014/0232651 A1    Aug. 21, 2014

(51) Int. Cl.
*G02B 27/01*    (2006.01)
*G06F 3/01*    (2006.01)

(52) U.S. Cl.
CPC .......... *G02B 27/0172* (2013.01); *G02B 27/017* (2013.01); *G06F 3/013* (2013.01); *G02B 2027/0112* (2013.01); *G02B 2027/0125* (2013.01); *G02B 2027/0174* (2013.01); *G02B 2027/0178* (2013.01); *G02B 2027/0187* (2013.01)

(58) Field of Classification Search
CPC ............ G02B 27/017; G02B 27/0172; G02B 27/0176; G02B 2027/0174; G02B 2027/0178
See application file for complete search history.

(56) References Cited

U.S. PATENT DOCUMENTS

| | | | |
|---|---|---|---|
| 6,185,016 B1* | 2/2001 | Popovich | 359/15 |
| 6,747,612 B1* | 6/2004 | Knox | 345/8 |
| 8,213,065 B2 | 7/2012 | Mukawa | |
| 8,639,072 B2 | 1/2014 | Popovich et al. | |
| 2001/0024177 A1* | 9/2001 | Popovich | 345/8 |
| 2006/0001977 A1* | 1/2006 | Shimizu | G02B 27/0103 359/630 |
| 2006/0017657 A1* | 1/2006 | Yamasaki | G02B 27/017 345/8 |
| 2006/0018027 A1* | 1/2006 | Yamasaki | G02B 27/017 359/631 |
| 2006/0019614 A1* | 1/2006 | Yamasaki | G02B 27/017 455/90.2 |
| 2006/0114533 A1 | 6/2006 | Sutherland et al. | |
| 2008/0239422 A1 | 10/2008 | Noda | |
| 2010/0103078 A1* | 4/2010 | Mukawa | G02B 27/0172 345/8 |
| 2010/0157400 A1 | 6/2010 | Dimov et al. | |
| 2012/0019662 A1 | 1/2012 | Maltz | |

(Continued)

FOREIGN PATENT DOCUMENTS

EP    0834097 B1    8/2001
JP    2001-117046 A    4/2001

OTHER PUBLICATIONS

PCT/US2014/012819; PCT International Search Report and Written Opinion of the International Searching Authority, mailed Apr. 28, 2014, 15 pages.

(Continued)

*Primary Examiner* — Gene W Lee
(74) *Attorney, Agent, or Firm* — Blakely Sokoloff Taylor & Zafman LLP

(57) ABSTRACT

An apparatus for a head mounted display includes a display module for launching display light along a forward propagating path. The apparatus also includes a light relay to receive the display light. The light relay includes a first optic disposed along the forward propagating path. The light relay also includes a second optic disposed along the forward propagating path between the first optic and the display module. The first optic is configured to direct the display light in an eye-ward direction and the second optic is configured to direct the display light in an eye-ward direction.

12 Claims, 10 Drawing Sheets

(56) References Cited

U.S. PATENT DOCUMENTS

| | | |
|---|---|---|
| 2012/0050142 A1 | 3/2012 | Border et al. |
| 2012/0081564 A1 | 4/2012 | Kamiya |
| 2012/0162734 A1 | 6/2012 | Lambert |
| 2013/0016292 A1* | 1/2013 | Miao et al. .................. 349/11 |
| 2013/0077049 A1* | 3/2013 | Bohn .................. G02B 5/20 351/210 |
| 2013/0250431 A1* | 9/2013 | Robbins et al. .............. 359/633 |
| 2013/0314793 A1* | 11/2013 | Robbins et al. .............. 359/573 |
| 2013/0322810 A1* | 12/2013 | Robbins .................. G02B 5/30 385/11 |

OTHER PUBLICATIONS

PCT/US2014/012819—International Preliminary Report on Patentability and Written Opinion, mailed Aug. 27, 2015 (12 pages).

* cited by examiner

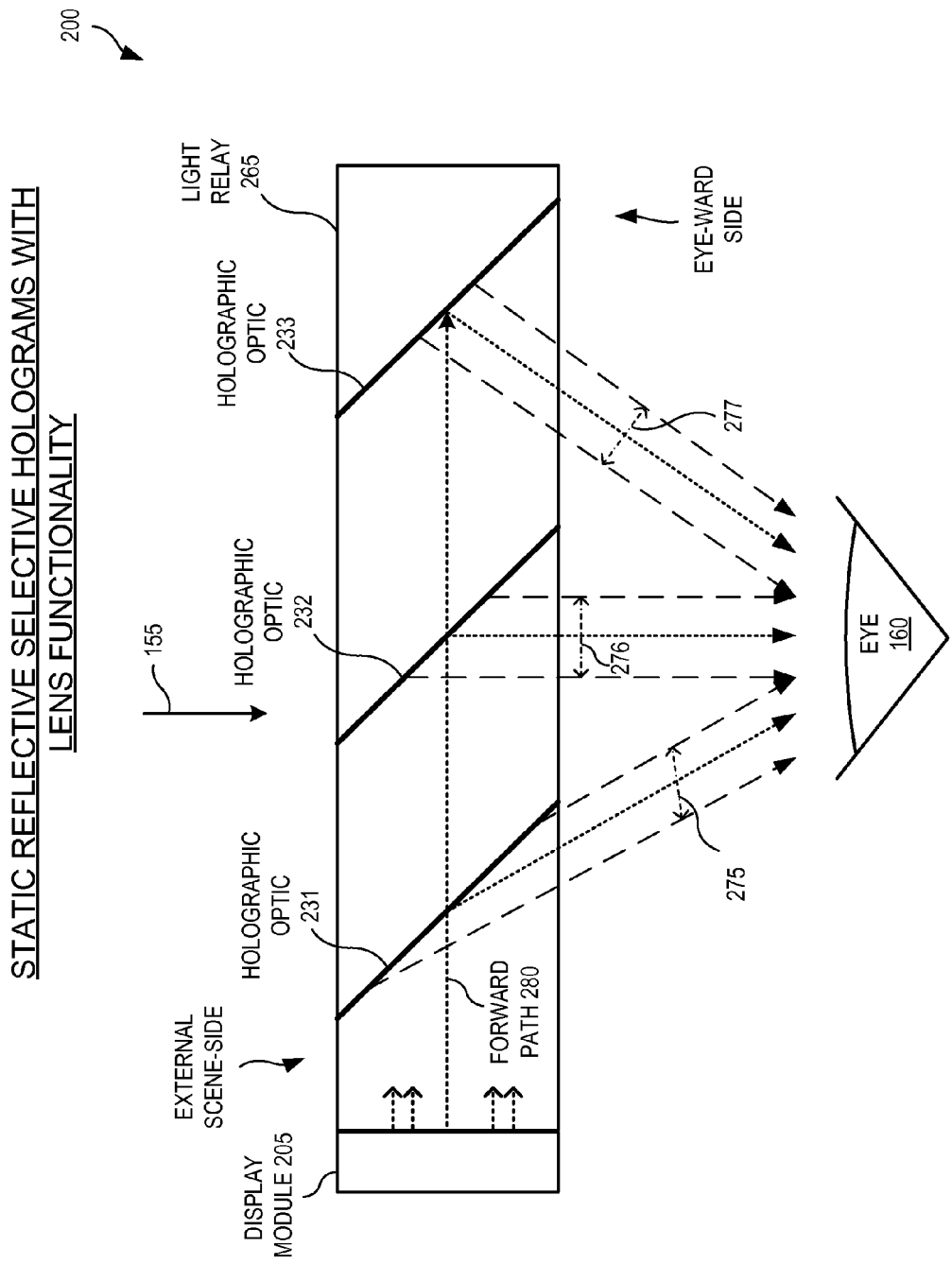

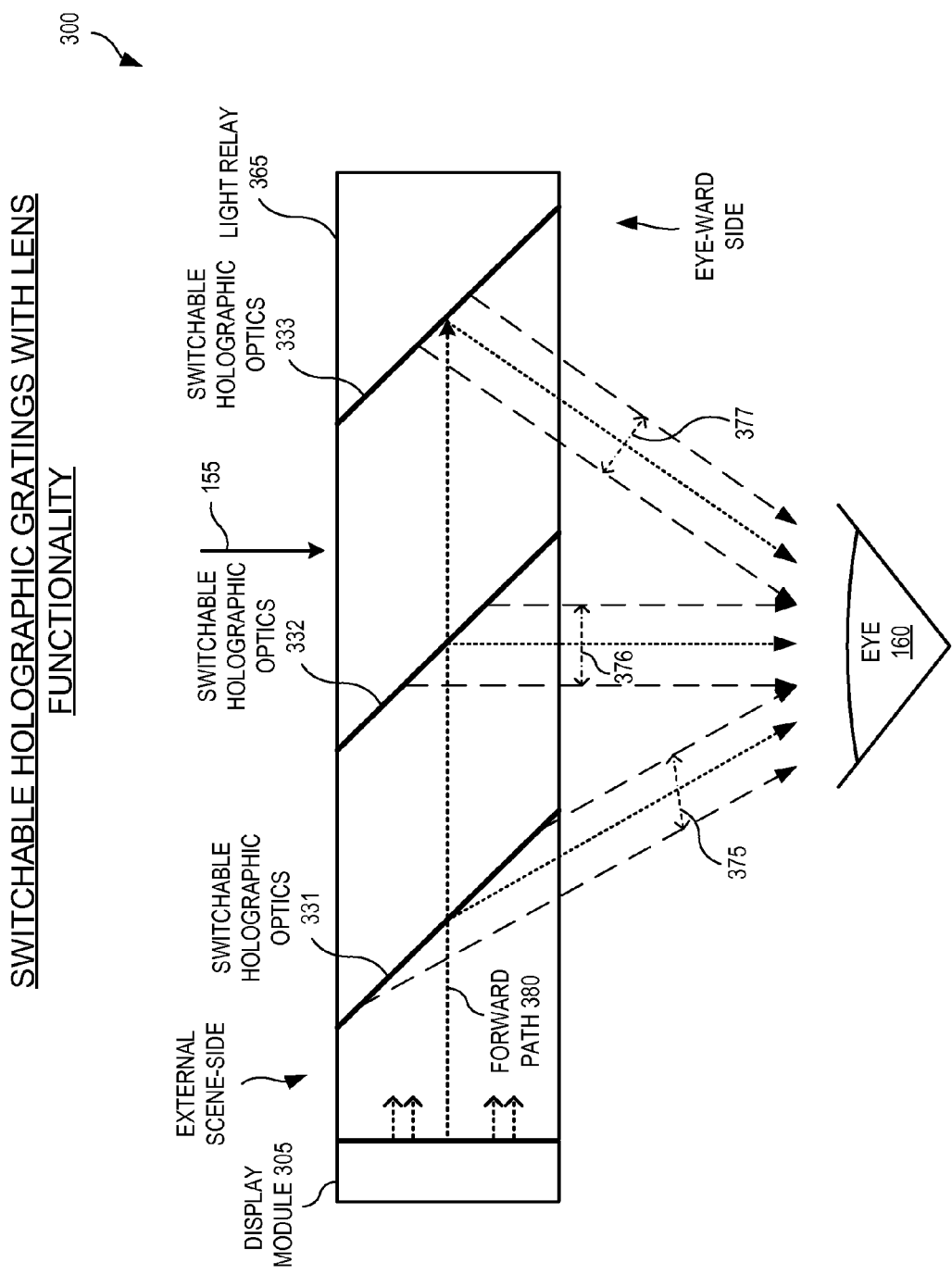

CASCADING OPTICS IN OPTICAL COMBINERS OF HEAD MOUNTED DISPLAYS

TECHNICAL FIELD

This disclosure relates generally to optics, and in particular but not exclusively, relates to head mounted displays.

BACKGROUND INFORMATION

A head mounted display ("HMD") is a display device worn on or about the head. HMDs usually incorporate some sort of near-to-eye optical system to form a virtual image located somewhere in front of the viewer. Single eye displays are referred to as monocular HMDs while dual eye displays are referred to as binocular HMDs. Occlusion HMDs, also called immersion HMDs, project a virtual image over a black background (the projection optics are not see-through). See-through HMDs also project a virtual image, but they are at the same time transparent (or semi-transparent) and the projection optics are called combiner optics, since they combine the virtual image over the reality. Such optics may be more complex than optics used in immersion HMDs. Augmented reality is one aspect of see-through HMDs, where the virtual image is superimposed to the reality.

HMDs have numerous practical and leisure applications. Historically, the first applications were found in aerospace applications, which permit a pilot to see vital flight control information without taking their eye off the flight path (these are referred to as Helmet Mounted Displays and are often used for rotary wing aircrafts). Heads Up Displays ("HUDs") are usually used in non rotary wing aircrafts such as planes and jet fighters, where the combiner is located on the windshield rather than on the helmet. HUDs are also used in automobiles, where the optical combiner can be integrated in the windshield or close to the windshield. Public safety applications include tactical displays of maps and thermal imaging. Other application fields include video games, transportation, and telecommunications. There is certain to be newfound practical and leisure applications as the technology evolves; however, many of these applications are limited due to the size, weight, field of view, and efficiency of conventional optical systems used to implement existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 2A depicts a top cross-section view of an example optical combiner including a display module, a light relay, and holographic optics directing display light toward an eye-ward side of the light relay, in accordance with an embodiment of the disclosure.

FIG. 3 depicts a top cross-section view of an example optical combiner including a display module, a light relay, and switchable holographic optics directing display light toward an eye-ward side of the light relay, in accordance with an embodiment of the disclosure.

DETAILED DESCRIPTION

Embodiments of an apparatus and methods for using cascaded optics in optical combiners are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
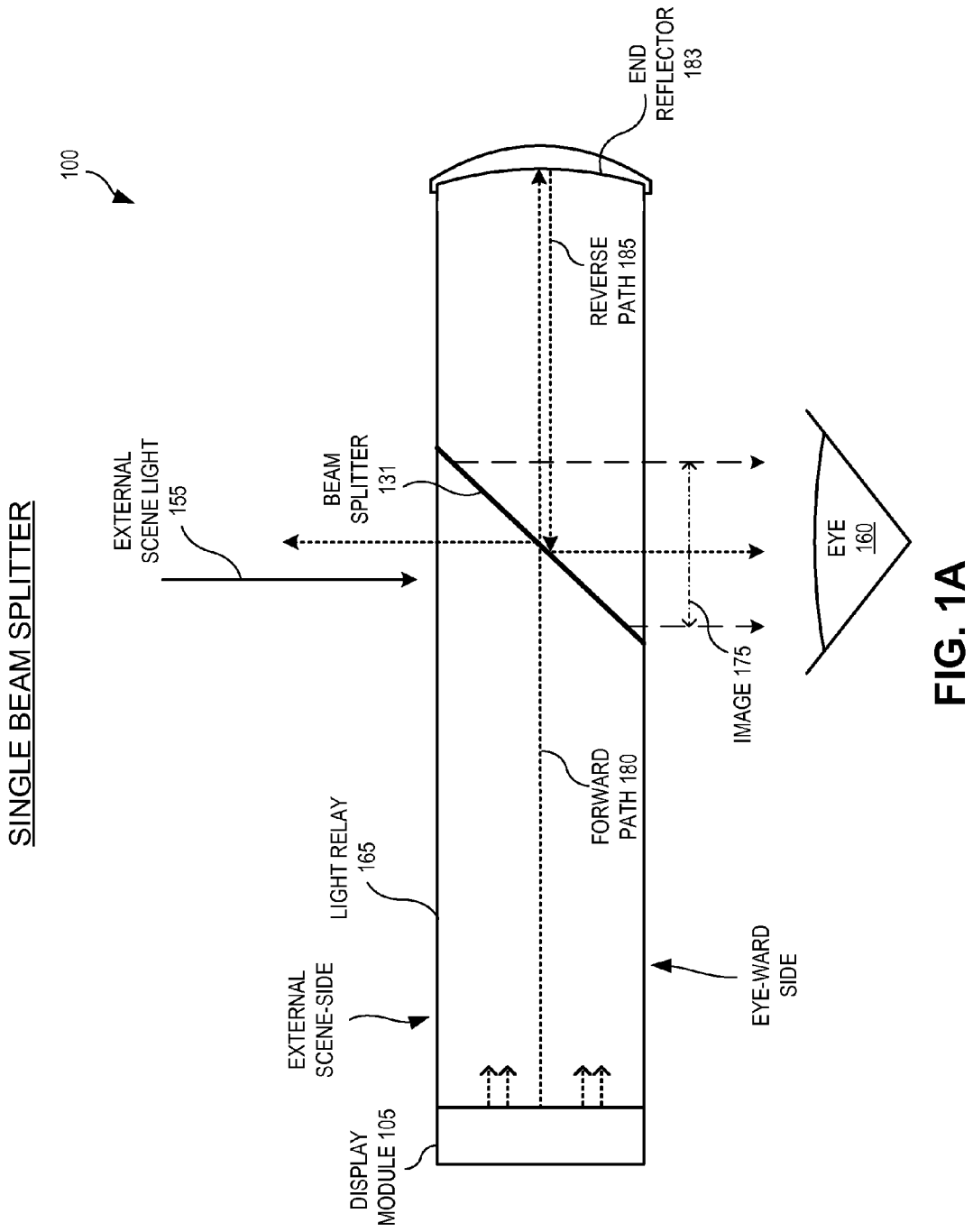
FIG. 1A depicts a top cross-section view of an example optical combiner including a display module, a light relay, a beam splitter, and an end reflector, in accordance with an embodiment of the disclosure.

FIG. 1A depicts a top cross-section view of an example optical combiner 100 including a display module 105, a light relay 165, a beam splitter 131, and an end reflector 183, in accordance with an embodiment of the disclosure. Optical combiner 100 may be integrated in a head gear to form a head mounted display ("HMD"). Display module 105 may be implemented by a light emitting diode ("LED") array, an organic LED ("OLED") array, a quantum dot array, a laser scanner or otherwise. Display module 105 may also be implemented by a light source (e.g. laser, LED, or bulb) backlighting an LCD display or a liquid crystal on silicon ("LCOS") panel reflecting a light source. Display module 105 may be considered a "micro-display." End reflector 183 may be a concave mirror.

"In operation, display module 105 launches display light (which may be computer-generated imagery ("CGI") light) along a forward path 180 toward end reflector 183. Light relay 165 may have a transparent structure to permit most or a large part of the display light to pass through along forward path 180. Light relay 165 may be fabricated of a solid transparent material (e.g., glass, quartz, acrylic, clear plastic, PMMA, ZEONEX-E48R, etc.) or be implemented as a solid housing having an inner air gap through which the display light passes. Light relay 165 may operate to protect the optical path, but may not necessarily use total internal reflection ("TIR") to guide or confine the display light."

Along forward path 180, display light encounters beam splitter 131. Beam splitter 131 reflects a first portion of the display light towards the external scene-side of optical combiner 100 and passes a second portion of the display light. In one embodiment, beam splitter 131 is a 45 degree 50/50 non-polarizing beam splitter, meaning it reflects 50 percent of light and passes the other 50 percent of light. The display light passed by beam splitter 131 continues along forward path 180 and end reflector 183 reflects back the display light along a reverse path 185. The display light along reverse path 185 encounters beam splitter 131, which reflects a portion of the display light along reverse path 185 toward an eye-ward side of optical combiner 100. The illustrated embodiment of FIG. 1A allows the display light launched by display module 105 to be projected into eye 160 of a user, which is how image 175 is directed to eye 160. In addition to directing image 175 into eye 160, optical combiner 100 (and other optical combiners referenced in the disclosure) may also allow at least a portion of external scene light 155 to reach eye 160 (after a portion is reflected by beam splitter 131). In other cases, the optics in the disclosed optical combiners may also be used in a non-see through HMDs if an opaque optic is positioned on the external scene side of the optic.

Figure 1B:
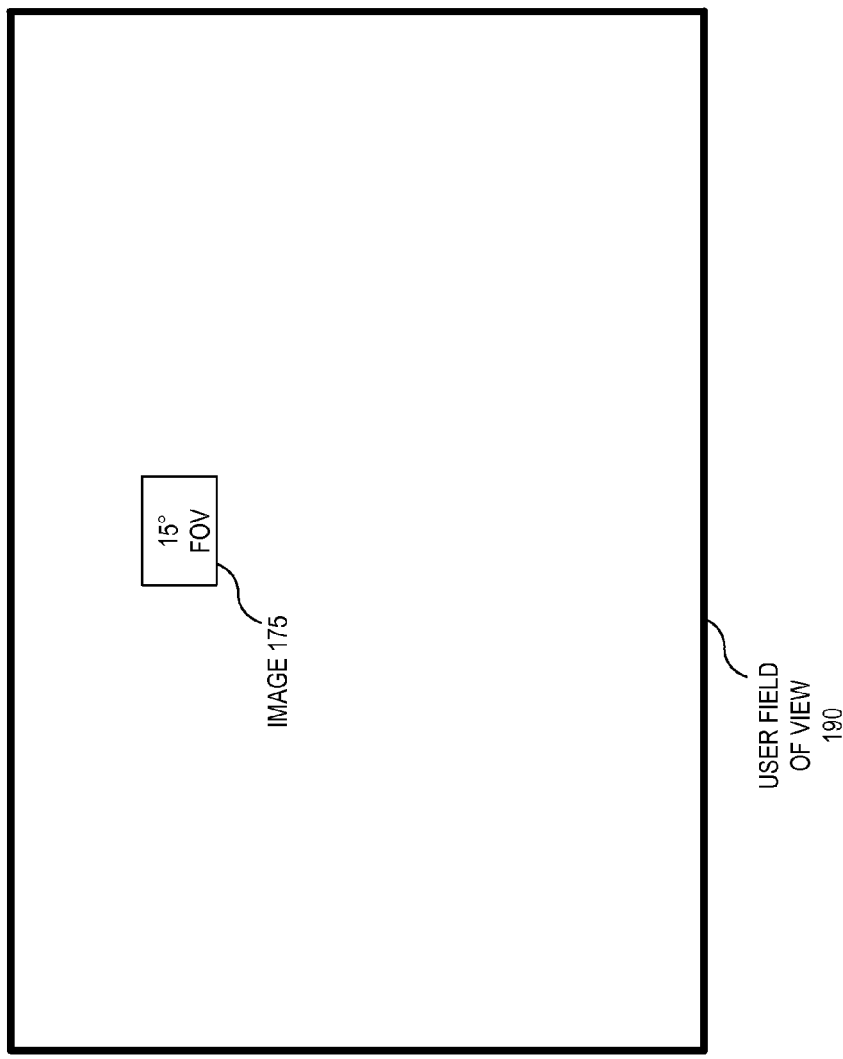
FIG. 1B illustrates a computer generated image directed into an estimated field of view of a user of the optical combiner illustrated in FIG. 1A, in accordance with an embodiment of the disclosure.

FIG. 1B illustrates an estimated field of view of a user of optical combiner 100, in accordance with an embodiment of the disclosure. A typical user of an HMD may have a natural field of view ("FOV") of nearly 180° horizontally. Image 175 from optical combiner 100 may only be presented to the user in 15° (horizontally) of the user's total FOV. In certain contexts, it would be advantageous to present images and information to a user in more than 15° (horizontally) of the user's total FOV.

FIG. 2A depicts a top cross-section view of an example optical combiner 200 including a display module 205, a light relay 265, and reflective holograms 231, 232, and 233 directing display light toward an eye-ward side of light relay 265, in accordance with an embodiment of the disclosure. Light relay 265 includes reflective holograms 231, 232, and 233 and is coupled to receive display light from the display module. Since more than one optic (in this case holograms 231, 232, and 233) is disposed to receive the display light, the optics may be considered to be in a "cascading" or "cascaded" configuration. Reflective holograms 231, 232, and 233 may be volume holograms.

As is known in the art, holographic optics can be designed to reflect specific wavelengths of light while passing other wavelengths of light (known as the Bragg selectivity in volume holograms, both in spectral or angular aspects). In addition, holographic optics can be designed to reflect specific wavelengths at different orders of diffraction to manipulate the angle that the light is reflected (spectral aspect of the Bragg selectivity). Reflecting the specific wavelengths at particular orders of diffraction can facilitate directing the specific wavelength into eye 160. To accomplish these reflections of specific wavelengths, the holographic optics are angle-tuned to a known angle and optical functionality, such as a lensing or collimation functionality. In other words, to design holographic optics, a designer must consider the desired light color to be reflected, the angle the desired light color will strike the holographic optic, and the required order of diffraction (if any) to direct the desired light color to the desired location. In addition to reflecting specific wavelengths, those skilled in the art understand that lensing functionality (with results similar to refractive lenses) can be designed into holographic optics. Holographic optics may have the advantage over refractive/reflective/catadioptric optics that they can have various optical functionalities depending on how they are illuminated (e.g. angle of incidence wavelength, polarization). These unique properties are summarized in the well know Bragg selectivity of volume holograms. Volume holograms can be static or dynamic.

Thin holograms or diffractive optics may not be able to implement the Bragg selectivity of volume holograms. However, thin holograms can approximate or mimic Bragg selectivity with optical coatings and special fabrication techniques. For example, for one wavelength and angle of incidence, the hologram acts as a transparent window, and for another angle and/or wavelength, it can act as a grating or off-axis lens.

Using conventional techniques that include creating interference patterns between a reference beam and a second beam, holograms may be "written" or "recorded" into photoactive holographic mediums such as silver-halide, photopolymer, dichromated gelatins, or otherwise. The interference patterns may be calculated in software before translating them into the holographic medium. The resulting holographic optics may be designed to be transmissive or reflective. Holographic mediums are available from DuPont™ and other companies. The holographic optics and switchable holographic optics ("SHOs") described in this disclosure may utilize one or more of the above technologies and design techniques to accomplish the functional operations that are described in association with the holographic optics or switchable holographic optics.

Using one or more of the above referenced technologies and techniques, each of holograms 231, 232, and 233 may be configured to direct and collimate the display light (propagating along forward path 280) toward an eye-ward side of light relay 265, in order to produce a virtual image located a few meters in front of the viewer. Each hologram 231, 232, and 233 may be tuned to reflect specific wavelengths of light (e.g. using Bragg selectivity principles if using volume holograms) based on the angle that display light from display module 205 will encounter the holographic optic as it propagates down forward path 280. The angle that the holographic optic is positioned in light relay 265 may need to be taken into consideration.

Each hologram 231, 232, and 233 may be configured to collimate a specified wavelength field of light (by designing lensing functionality into the holographic optic) onto eye 160. Since optical combiner 200 may be positioned too close to eye 160 for the user to focus on images directed into eye 160 from display module 205, the holographic optics may need to focus (e.g. collimate) the specified wavelength of light to eye 160 for user readability. In one embodiment, the specified wavelength of light is collimated by each holographic optic so that an image directed to the eye appears to the user as coming from essentially infinity. "Essentially infinity" or "infinity" in the field of optics is sometimes considered to be a focus distance of greater than three meters.

In operation, display module 205 launches display light along forward propagating path 280. Display light encounters hologram 231 along forward path 280 and hologram 231 directs and focuses (e.g. collimates) a first spectrum of the display light toward an eye-ward side of light relay 265. Hologram 231 may reflect the first spectrum of display light into a first image region seen by eye 160 (it is said to be on-Bragg for this color and/or angle, all other light fields are said to be off-Bragg and do not see hologram 231). The display light in the first spectrum may form image 275 in the illustrated embodiment. Display light that is not in the first spectrum of the display light (on-Bragg for hologram 231) may pass through hologram 231 and continue along forward path 280 until it encounters hologram 232, for which it is on-Bragg, the rest of the light being off-Bragg for 232 and continuing towards hologram 233 (both in wavelength and angle).

Hologram 232 may direct and focus a second spectrum (or angular field) of the display light toward an eye-ward side of light relay 265. Holographic optic 232 may reflect the second spectrum of display light into a second image region seen by eye 160. The display light in the second spectrum may form image 276 in the illustrated embodiment. Display light that is not in the first or second spectrums of the display light may pass through holographic optic 232 (off-Bragg) and continue along forward path 280 until it encounters holographic optic 233 (on-Bragg).

Hologram 233 may direct and focus (e.g. collimate) a third spectrum of the display light toward an eye-ward side of light relay 265. Hologram 233 may reflect the third spectrum (and/or angular field) of display light into a third virtual image region seen by eye 160. The display light in the third spectrum may form image 277 in the illustrated embodiment. Any display light that is not in the first, second, or third spectrums (or angular fields) of the display light may pass through hologram 233 and exit optical combiner 200.

Hologram 231 may be considered positive off axis, holographic optic 232 may be considered on axis, and hologram 233 may be considered negative off axis because of their relative orientation to eye 160 and the direction that they direct the display light. Holographic optic 231 may be considered "on Bragg" for the first spectrum of display light, holographic optic 232 may be considered "on Bragg" for the second spectrum of display light, and holographic optic 233 may be considered "on Bragg" for the third spectrum of display light.

In one embodiment, display module 205 includes three different light sources. In one embodiment, the three different light sources are three different lasers each configured to emit a different color (e.g. red, green, and blue "RGB") of the display light. In one embodiment, the three different light sources are three different LEDs each configured to emit a different color (e.g. "RGB") of the display light. Holographic optics 231, 232, and 233 may be configured to reflect the different colors of the three different light sources.

Figure 2B:
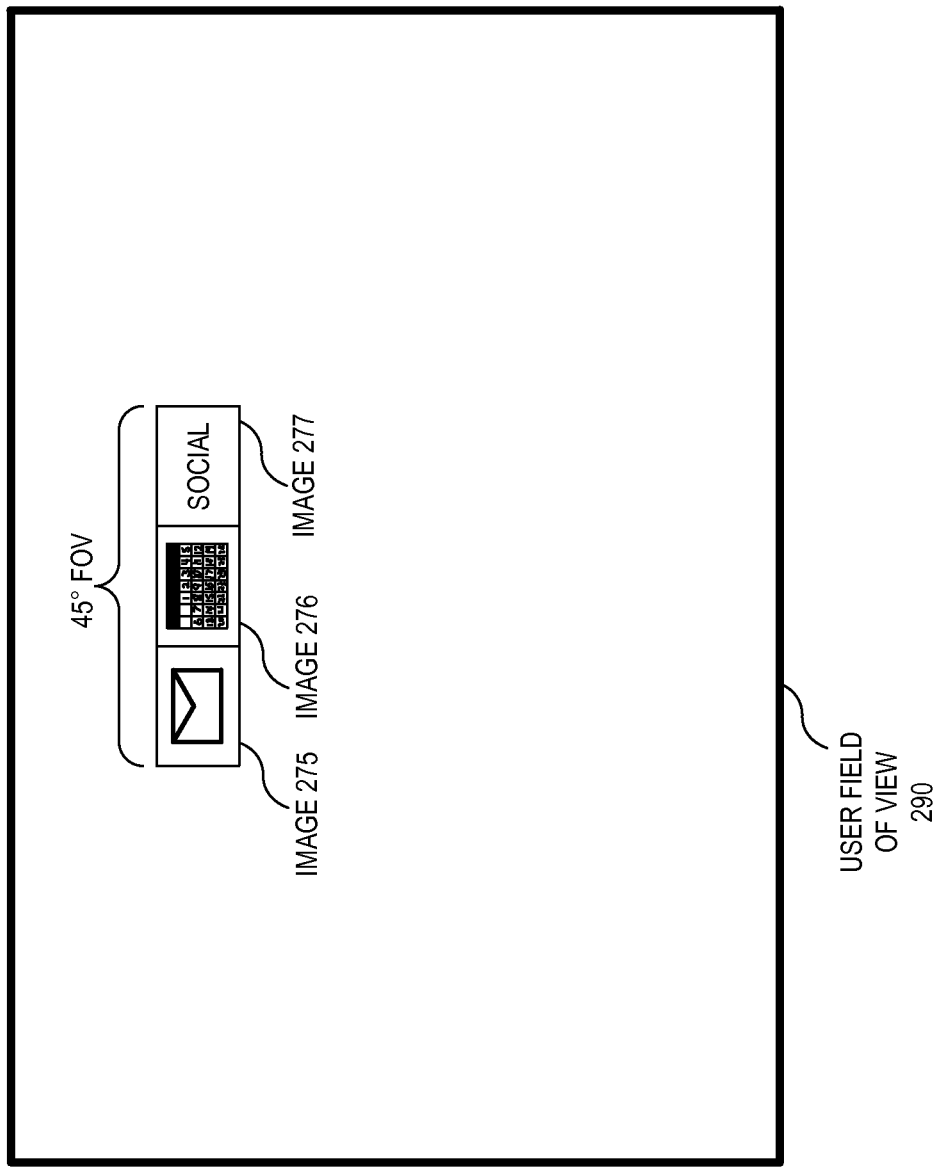
FIG. 2B illustrates three computer generated images directed into an estimated field of view of a user of the optical combiner illustrated in FIG. 2A, in accordance with an embodiment of the disclosure.

FIG. 2B illustrates three computer generated images directed into an estimated field of view of a user 290 of optical combiner 200, in accordance with an embodiment of the disclosure. Image 276 is presented to the user's eye between image 275 and image 277. In one embodiment, each image is presented in 15° (horizontally) of the user's total FOV, so images 275, 276, and 277 are presented in a total of 45° (horizontally) of the user's total FOV.

Holographic optic 231 may be configured to direct the first spectrum of display light to a first image region to direct image 275 into eye 160 of the user. Holographic optic 232 may be configured to direct the second spectrum of display light to a second image region to direct image 276 into eye 160 of the user. Holographic optic 233 may be configured to direct the third spectrum of display light to a third image region to direct image 277 into eye 160 of the user. In the illustrated embodiment, the image 275, image 276, and image 277 are side by side, but they may overlap or be presented with spaces between the images in other embodiments. In some contexts, it may be advantageous to direct the images in the top portion of user FOV 290 so that a user's straight ahead line-of-sight is not impeded by images 275, 276, and 277. In other contexts, the images may be directed to different image regions in the user's FOV.

In one embodiment, display module 205 is coupled to a controller that controls display module 205. The controller may be connected to a network to receive and transmit information to a user. The controller may instruct display module 205 to generate display light in the first spectrum that causes holographic optic 231 to display email information as image 275 in the first image region. The controller may instruct display module 205 to generate display light in the second spectrum that causes holographic optic 232 to display calendar information as image 276 in the second image region. And, the controller may instruct display module 205 to generate display light in the third spectrum that causes holographic optic 233 to display social media information as image 277 in the third image region.

In a "simultaneous mode," the three different images (275, 276, and 277) may be simultaneously displayed by display module 205 as one image while the holographic optics 231, 232, and 233, reflect their respective spectrums embedded in the one image. Alternatively, in "interlace mode," display module 205 may display image 275 in the first spectrum for a time period, then display image 276 in the second spectrum for a time period, and then display image 277 in the third spectrum for a time period. In "interlace mode", display module 205 may cycle through the displayed images fast enough to be unnoticed by a user (the user will perceive that images 275, 276, and 277 are displayed simultaneously), due to the persistence of light on eye 160. The display modules discussed below may also utilize "simultaneous mode" and "interlace mode," where applicable. Additionally, the user field of view 290 depicted in FIG. 2B may apply to embodiments discussed below that present images to an eye 160 of a user.

Referring now to FIG. 3, in addition to the static hologram optics illustrated in FIG. 2A, switchable holographic optics exist that allow holographic optics to be switched on and off, or produce grey scale diffraction efficiencies. While a switchable holographic optic is activated (switched on), it affects light according to the laws of the holographic optics recorded in the holographic medium. However, while the switchable hologram is deactivated (switched off), the switchable holographic optic may appear essentially transparent to light that encounters the switchable holographic optic, and act as a simple transparent glass window. When the switchable holographic optic is switched off, it may slightly affect the light that encounters it because of an index of refraction change associated with the holographic medium.

One switchable holographic optic technology is known as holographic polymer dispersed liquid crystal ("HPDLC"). As a brief overview, HPDLC technology uses electrical stimulation to align liquid crystals (mixed with a photoactive hologram medium) to form diffractive gratings. The electrical stimulation may then rotate the liquid crystals patterns to appear essentially transparent for a specific polarization, such that the liquid crystals are no longer forming diffractive gratings. HPDLC technology may be switchable from on to off in 50 us or faster, for example.

FIG. 3 depicts a top cross-section view of an example optical combiner 300 including a display module 305, a light relay 365, and switchable holographic optics ("SHO") 331, 332, and 333 directing display light toward an eye-ward side of the light relay 365, in accordance with an embodiment of the disclosure. It is appreciated that the features and functionality of holographic optics 231, 232, and 233 may be included in SHOs 331, 332, and 333. In the illustrated embodiment, each of SHO 331, 332, and 333 is configured to direct and focus (e.g. collimate) display light (propagating along forward path 380) toward an eye-ward side of light relay 365, when activated. Each SHO 331, 332, and 333 may be tuned to reflect specific wavelengths of light (using Bragg selectivity principles) based on the angle that display light from display module 305 will encounter the SHO as it propagates down forward path 380.

Each SHO may have only one Bragg selectivity to one specific spectrum (spectral bandwidth), or one specific angle (angular bandwidth) and those holographic optics will be referred to as having "singular selectivity" for purposes of this disclosure. In the illustrated embodiment, each SHO may be configured to include more than one Bragg selectivity, as it is possible to "record" more than one Bragg selectivity into a given holographic medium. Consequently, when activated, each of SHOs 331, 332, and 333 may be configured to direct multiple specific spectrums (e.g. RGB) of display light toward eye 160. In one embodiment, each SHO 331, 332, and 333 has three Bragg selective wavelengths. In one embodiment, each SHOs 331, 332, and 333 is configured (when activated) to reflect red, green, and blue light onto eye 160, for a specific sets of angles of incidence or angular bandwidth. SHOs configured to operate on more than one specific spectrum (having more than one Bragg selectivity) will be referred to as having "plural selectivity" for purposes of this disclosure.

Each SHO 331, 332, and 333 may also be configured to focus (e.g. collimate) specified wavelength(s) of light (by designing lensing functionality into the holographic optic) onto eye 160, when activated. Since optical combiner 300 may be positioned too close to eye 160 for the user to focus on images directed into eye 160 from display module 305, the SHOs may need to focus (e.g. collimate) the specified wavelength of light onto eye 160 for user readability.

Figure 4:
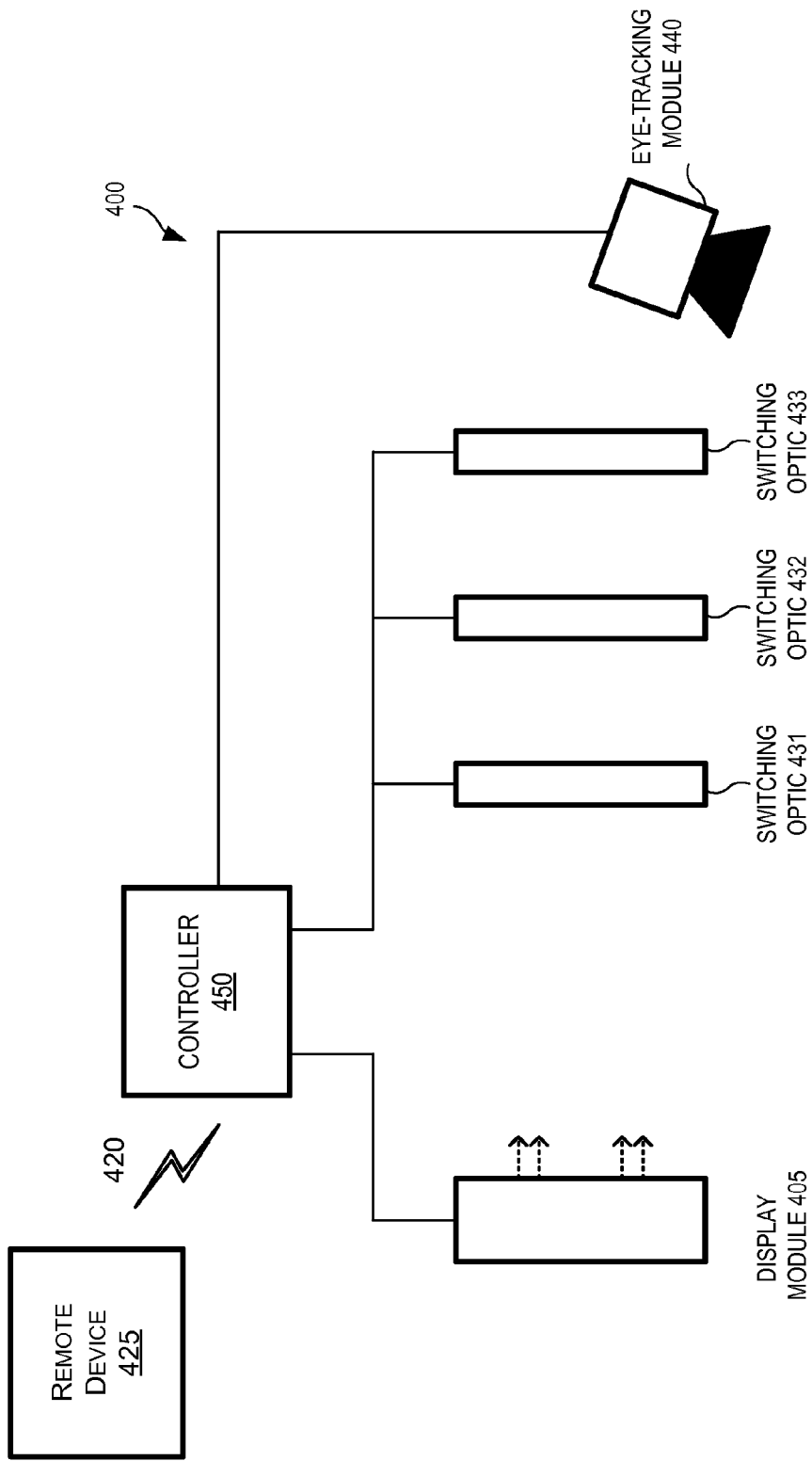
FIG. 4 is a block diagram schematic of an HMD system that includes a controller coupled to a display module, switching optics, and an eye-tracking module, in accordance with an embodiment of the disclosure.

FIG. 4 is a block diagram schematic of an HMD system 400 that includes a controller 450 coupled to a display module 405, switching optics 431, 432, and 433, and an eye-tracking module 440, in accordance with an embodiment of the disclosure. HMD system 400 may be disposed within an HMD, such as HMD 800, described below in association with FIG. 8.

In the illustrated embodiment, controller 450 is coupled to control the display light displayed by display module 405. Controller 450 may include logic circuitry such as a processor, a field-programmable gate array ("FPGA"), or otherwise. Controller 450 may also include a memory coupled to a processor. The memory may store images, user settings, and firmware/software that can be accessed and executed by the processor, for example.

Controller 450 may be connected to a network to receive and transmit information. In the illustrated embodiment, HMD system 400 communicates using a communication link 420 (e.g., a wired or wireless connection) to a remote device 425, which may be a server. Controller 450 may receive data from remote device 425, and configure the data for display with display module 405. Remote device 425 may be any type of computing device or transmitter including a laptop computer, a mobile telephone, or tablet computing device, etc., that is configured to transmit data to HMD system 400. Remote device 425 and HMD system 400 may contain hardware to enable the communication link 420, such as processors, transmitters, receivers, antennas, etc. Further, remote device 425 may take the form of or be implemented in a computing system that is in communication with and configured to perform functions on behalf of a client device, such as HMD system 400. Such a remote device 430 may receive data from another HMD system 400, perform certain processing functions on behalf of HMD system 400, and then send the resulting data back to HMD system 400. This functionality may be referred to as "cloud" computing.

In FIG. 4, communication link 420 is illustrated as a wireless connection; however, wired connections may also be used. For example, the communication link 420 may be a wired serial bus such as a universal serial bus or a parallel bus. A wired connection may be a proprietary connection as well. The communication link 420 may also be a wireless connection using, e.g., Bluetooth® radio technology, communication protocols described in IEEE 802.11 (including any IEEE 802.11 revisions), Cellular technology (such as GSM, CDMA, WiMAX, or LTE), or Zigbee® technology, among other possibilities. The remote device 430 may be accessible via the Internet and may include a computing cluster associated with a particular web service (e.g., social-networking, photo sharing, address book, etc.).

In FIG. 4, controller 450 is coupled to control turning on (activating) and turning off (deactivating) switching optics 431, 432, and 433. Switching optics 431, 432, and 433 may include SHOs 331, 332, and 333, respectively. Also in the illustrated embodiment, controller 450 is coupled to eye-tracking module 440. Eye tracking module 440 may image an eye of a user and report image data to controller 450. Controller 450 may be configured to control display module 405 and switching optics 431, 432, and 433 in response to the image data from eye-tracking module 440.

In an embodiment where switching holographic optics 431, 432, and 433 include SHOs 331, 332, and 333, respectively, controller 450 may activate and deactivate SHOs 331, 332, and 333 as a way to control what images are directed to the eye box 160. Referring back to FIG. 3, in operation, display module 305 launches display light along forward propagating path 380. The display light encounters SHO 331 along forward path 380.

If SHO 331 is activated, SHO 331 directs and focuses at least a portion of the display light toward an eye-ward side of light relay 365. If SHO 331 has singular reflectivity, it will reflect the first spectrum of display light into a first image region seen by eye 160. The display light in the first spectrum may form image 375 in the illustrated embodiment. Display light that is not in the first spectrum of the display light may pass through SHO 331 and continue along forward path 380 until it encounters SHO 332. If SHO 332 is not activated, display light may see it as virtually transparent and continue until encountering SHO 333. If SHO 333 is not activated, display light may see it as virtually transparent and exit light relay 365. If SHO 332 or 333 is activated, they will reflect and focus any display light propagating along forward path 380 that is within their specific spectrum(s) that they are configured to reflect and focus.

If SHO 331 has plural selectivity (and is activated), it will reflect and focus the specific spectrums of display light it is configured to reflect into a first image region seen by eye 160. This may leave very little (if any) display light propagating on forward path 380 past SHO 331, especially if SHO 331 is tuned to selectively reflect the same spectrums (e.g. RGB) emitted by light sources of display module 305.

If controller 450 has deactivated SHO 331, SHO 331 will appear essentially transparent to the display light propagating along forward path 380 and the display light will continue propagating until it encounters SHO 332. If SHO 332 is activated by controller 450, it may direct and focus the specific spectrums of display light it is configured to reflect into a second image regions seen by eye 160.

Controller 450 may be coupled to selectively activate SHOs 331, 332, and 333 in coordination with launching the display light from display module 305. Control module 450 may cause display module 305 to display a first image 375 while SHO 331 is activated. If SHO 331 has plural selectivity for each of a red, green, and blue light source of display module 305, SHO 331 may reflect and focus each of the red, green, and blue spectrums of the display light onto eye 160 as image 375.

After a time period (e.g. 1 ms) of displaying image 375 onto eye 160, controller may deactivate SHO 331. Then, controller 450 may activate SHO 332 and cause display module 305 to display a second image 376 while SHO 332 is activated. If SHO 332 has plural selectivity for each of a red, green, and blue light source of display module 305, SHO 332 may reflect and focus each of the red, green, and blue spectrums of the display light onto eye 160 as image 376.

After a time period (e.g. 1 ms) of displaying image 376 onto eye 160, controller 450 may deactivate SHO 332. Then, controller 450 may activate SHO 333 and cause display module 305 to display a third image 377 while SHO 333 is activated. If SHO 333 has plural selectivity for each of a red, green, and blue light source of display module 305, SHO 333 may reflect and focus (e.g. collimate) each of the red, green, and blue spectrums of the display light onto eye 160 as image 377.

Although there are time periods where each image 375, 376, and 377 are not directed to eye 160, those skilled in the art understand that the persistence of a human eye may cause a user to perceive images 375, 376, and 377 as persistent images. Consequently, controller 450 may cause display module 405 to launch interlaced images (which may each be RGB images) that are coordinated to be displayed to the eye 160 in conjunction with activating and deactivating SHO 331, 332, and 333. Images 375, 376, and 377 may be updated according to updated data, such as email, calendar, social media alerts, or the time of day.

In one embodiment, images 375, 376, and 377 combine to form a stitched-together image. In one embodiment, the three images combine to present readable text to a user. For example, if the user indicates that she would like to read a document or a book, image 375 may form a portion of the left side of the page, image 376 may form a portion of the middle of the page and image 377 may form a portion of the right side of the page so that all three images are used to present the page to the user. Controller 450 may have to instruct display module 305 in conjunction with selectively activating SHOs 331, 332, and 333 to present the page to the user. Or, if each SHO 331, 332, and 333 are singularly selective to different colors, color module 305 may simply display one image with the three images 375, 376, and 377 embedded in the one image as the respective specific spectrums that SHO 331, 332, and 333 are configured to singularly selective for.

Additionally, users of an HMD that incorporates optical combiner 300 may choose to cease email updates for example, for a period of time by interacting with a user interface (e.g. a touch-sensitive element) of the HMD. If the user has indicated that she prefers not to view email updates, controller 450 may deactivate SHO 331 and/or cause display module 405 to cease launching image 375. In one embodiment, the images that correspond with different image regions in the user's FOV may be user configurable according to the user's preference.

In one embodiment, controller 450 controls display module 405 and switching optics 431, 432, and 433 in response to eye-tracking module 440. Eye-tracking module 440 may include a complementary metal-oxide-semiconductor ("CMOS") image sensor positioned to monitor and image the user's eye 160. Using gaze data generated by imaging eye 160 with eye-tracking module 440, controller 450 may determine a direction in which the user is gazing. In response to the direction of gaze, controller 450 may control the images display module 305 launches along forward propagating path 380 in coordination with deactivating and activating SHO 331, 332, and 333 to advantageously select which images 375, 376, and 377 should be presented to eye 160.

Figure 5:
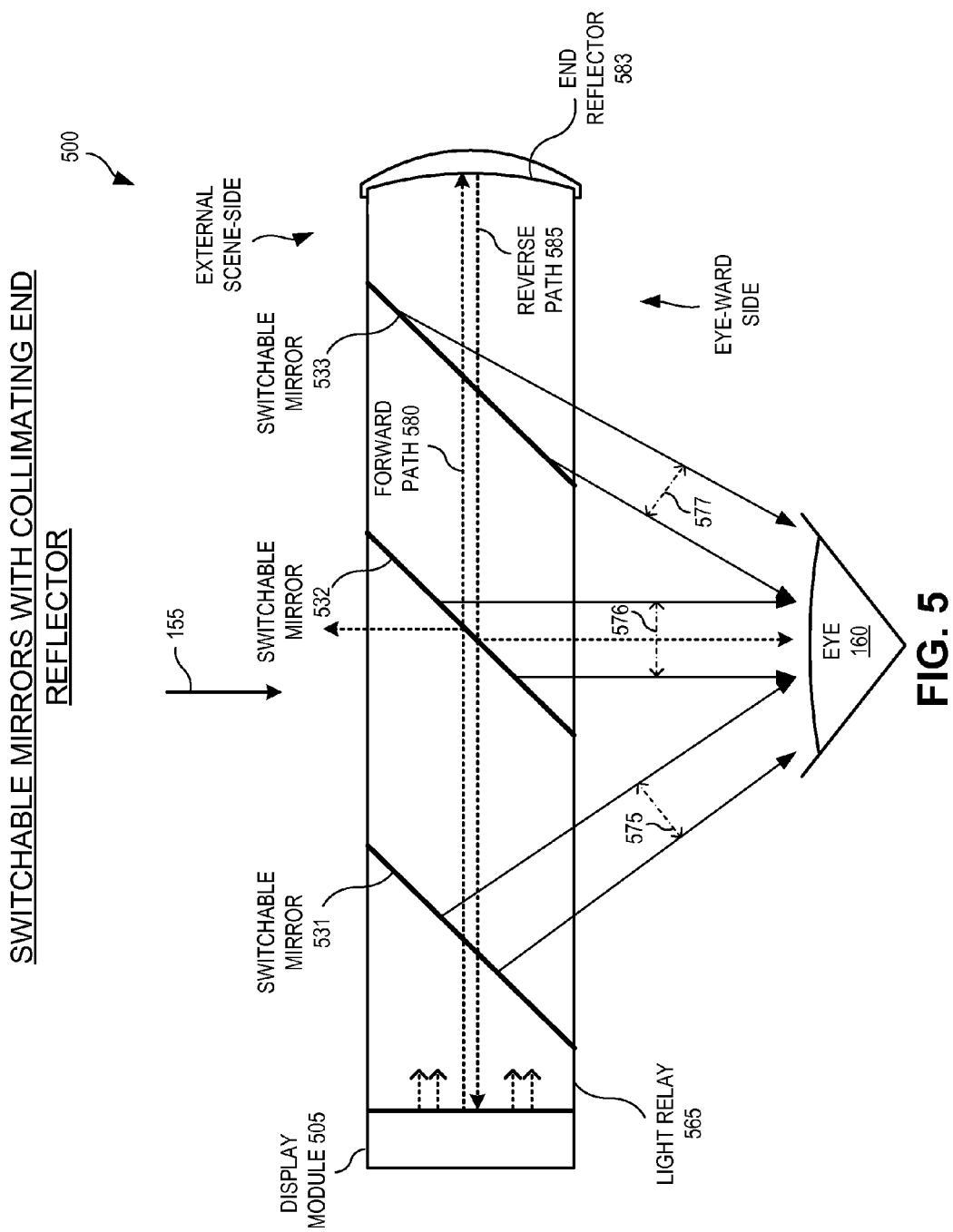
FIG. 5 depicts a top cross-section view of an example optical combiner including a display module, a light relay, and switchable mirrors, in accordance with an embodiment of the disclosure.

FIG. 5 depicts a top cross-section view of an example optical combiner 500 including a display module 505, a light relay 565, and switchable mirrors 531, 532, and 533, in accordance with an embodiment of the disclosure. Switching optics 431, 432, and 433 may include switchable mirrors 531, 532, and 533, respectively. Switchable mirrors 531, 532, and 533 may utilize liquid crystal switchable mirror technology, thin-film electrochromic technology, or other switchable mirror technologies known in the art. When the switchable mirrors are activated, they reflect a percentage of display light (e.g. 50%) and pass the remaining percentage of display light.

In operation, display module 505 launches display light along forward propagating path 580. Display light encounters switchable mirror 531 along forward path 580. If switchable mirror 531 is activated, a percentage of the display light is reflected toward the external scene-side of light relay 565 while the remaining percentage of the display light continues along forward path 580. If switchable mirror 531 is activated, switchable mirrors 532 and 533 may be deactivated so they will appear essentially transparent to the remaining display light that will propagate along forward path 580 until encountering end reflector 583. In the illustrated embodiment, end reflector 583 is a concave mirror configured to collimate the display light and reflect the display light along reverse propagating path 585. After the display light passes through switchable mirrors 532 and 533 (which will appear essentially transparent if deactivated) along reverse path 585, the display light will encounter the activated switchable mirror 531. A portion of the display light propagating along reverse path 585 will pass through switchable mirror 531, but a percentage of the display light will also be directed toward into a first image region as image 575, seen by eye 160. Since end reflector 583 functions as a collimating element, eye 160 may be able to better focus on image 575.

To project image 576 into a second image region, switchable mirror 532 is activated and switchable mirrors 531 and 533 are deactivated while display module 505 launches display light. To project image 577 into a third image region, switchable mirror 533 is activated and switchable mirrors 531 and 532 are deactivated while display module 505 launches display light. It is appreciated that controller 450 may selectively activate each switchable mirror 531, 532, and 533 in coordination with instructing display module to display images 575, 576, and 577 to synchronize the switchable mirrors with projected images. As discussed above, the images may be cycled at a speed fast enough such that the user perceives three persistent images due to the light integration time of the human eye.

Figure 6:
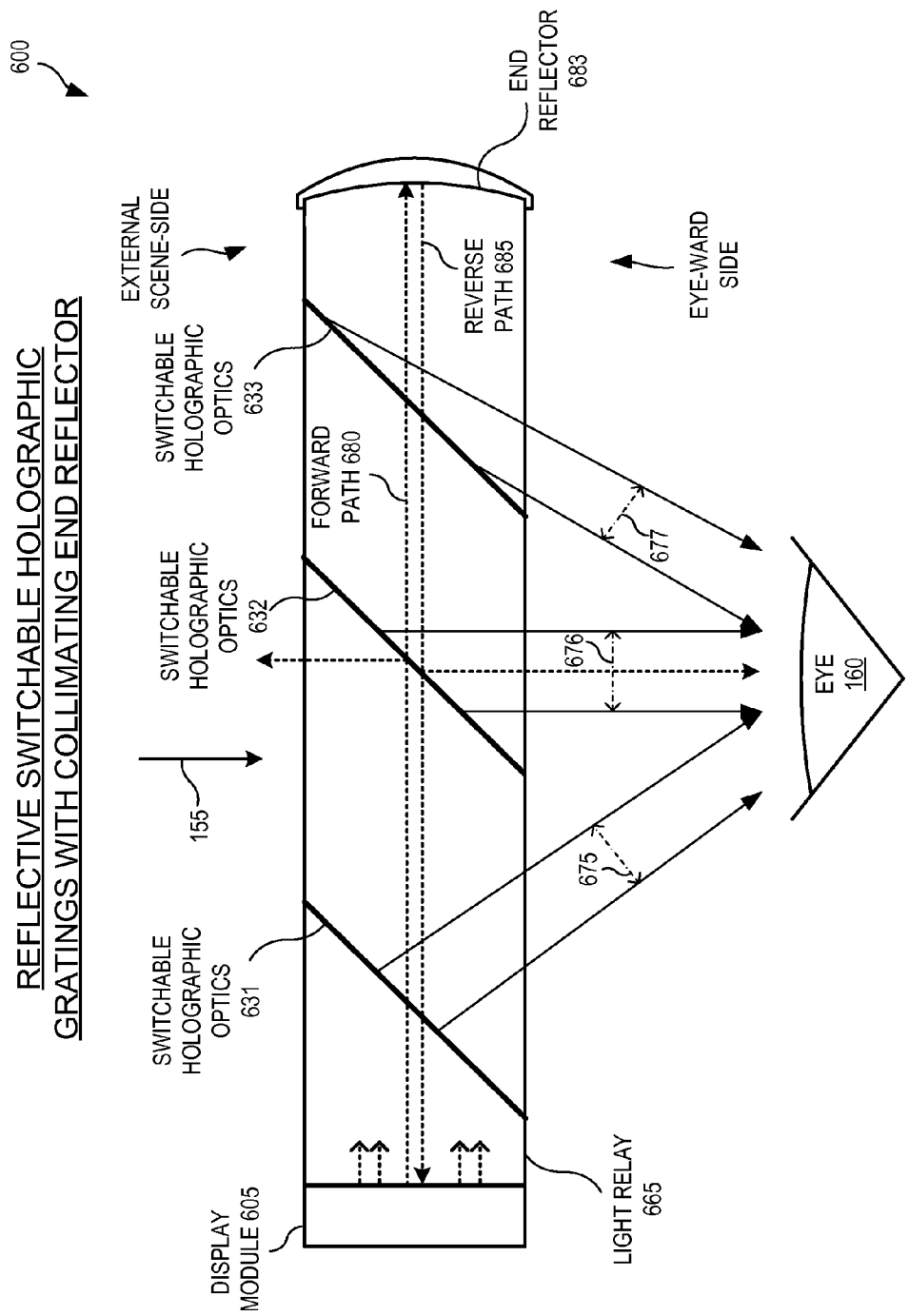
FIG. 6 depicts a top cross-section view of an example optical combiner including a display module, a light relay, an end reflector and switchable holographic optics, in accordance with an embodiment of the disclosure.

FIG. 6 depicts a top cross-section view of an example optical combiner 600 including a display module 605, a light relay 665, an end reflector 683 and SHOs 631, 632, and 633, in accordance with an embodiment of the disclosure. Switching optics 431, 432, and 433 may include SHOs 631, 632, and 633, respectively.

In operation, display module 605 launches display light along forward propagating path 680. The display light encounters SHOs 631, 632, and 633 along forward path 680. However, in the illustrated embodiment, SHOs 631, 632, and 633 are not angle-tuned to be selective (or "on Bragg") to spectrums of display light launched from display module 605. Instead, they are angle-tuned to be selective to spectrums of display light reflected by end reflector 683. Hence, even when SHOs 631, 632, and 633 are activated, they are essentially transparent to display light propagating along forward path 680.

In the illustrated embodiment, end reflector 683 is a concave mirror configured to collimate the display light and reflect the display light along reverse propagating path 585. After the display light is reflected and collimated by end reflector 683 and traveling along reverse path 685, it will encounter SHO 633. If SHO 633 is activated, it may direct a first spectrum (if it has singular selectivity) or multiple spectrums (if it has plural selectivity) of display light toward a third image region as image 677, seen by eye 160. If SHO 633 is deactivated, it will appear essentially transparent to the display light propagating along reverse path 685. If SHO 632 is activated, it may direct a second spectrum (if it has singular selectivity) or multiple spectrums (if it has plural selectivity) of display light toward a second image region as image 676, seen by eye 160. If SHO 632 is deactivated, it will appear essentially transparent to the display light propagating along reverse path 685. If SHO 631 is activated, it may direct a third spectrum (if it has singular selectivity) or multiple spectrums (if it has plural selectivity) of display light toward a first image region as image 675, seen by eye 160. If SHO 631 is deactivated, it will appear essentially transparent to the display light propagating along reverse path 685.

It is appreciated that controller 450 may selectively activate each SHO 631, 632, and 633 in coordination with instructing display module to display images 675, 676, and 677 to synchronize the SHOs with projected images. As discussed above, the images may be cycled at a speed fast enough such that the user perceives three persistent images due to the light integration time of the human eye.

Of note is that SHOs 631, 632, and 633 may not necessarily include any lensing functionality recorded into their holographic mediums because end reflector 683 may sufficiently collimate the display light for the user to focus on the images 675, 676, and 677.

Figure 7:
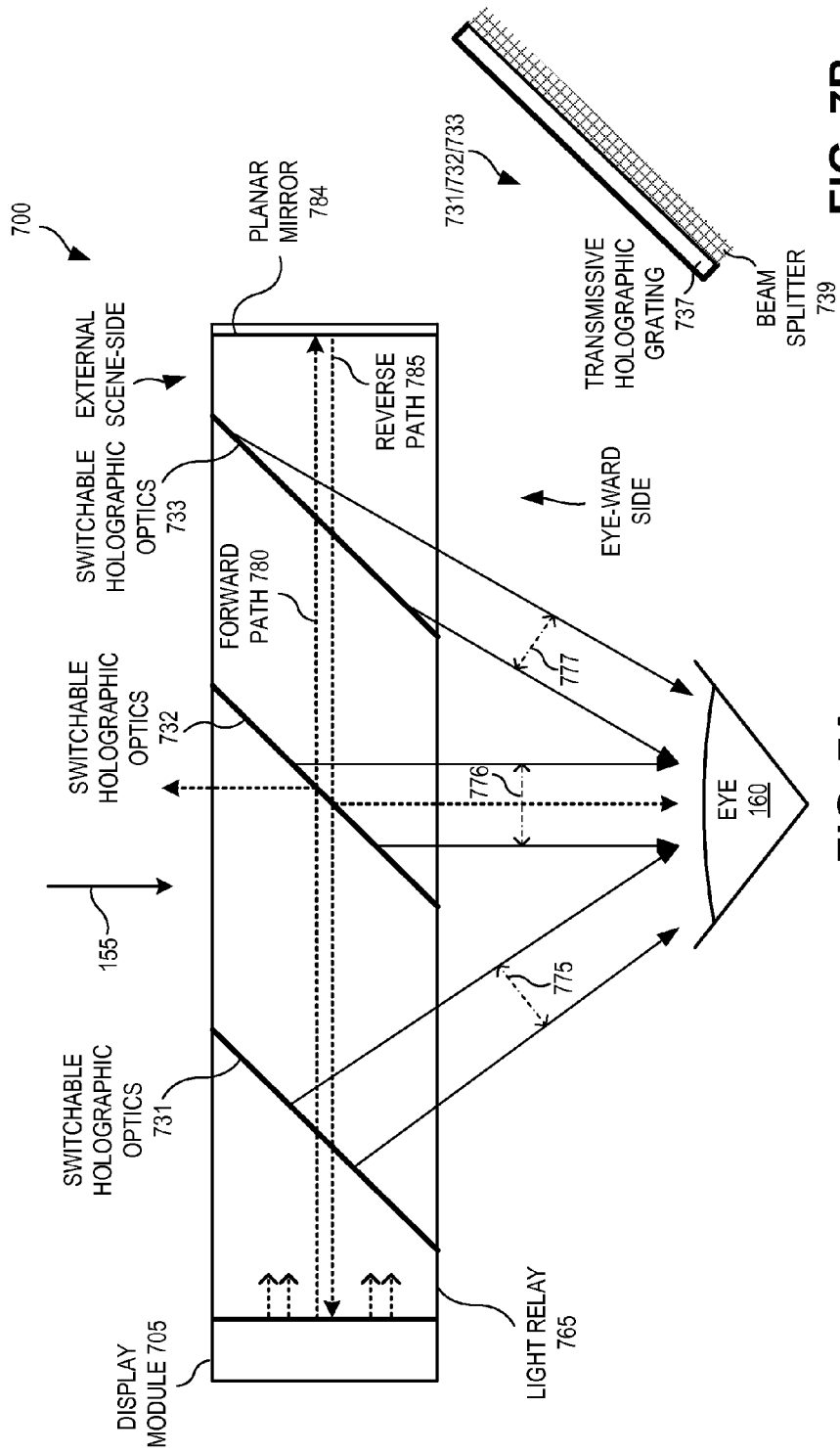
FIG. 7A depicts a top cross-section view of an example optical combiner including a display module, a light relay, an end reflector and switchable holographic optics, in accordance with an embodiment of the disclosure.
FIG. 7B illustrates an example switchable holographic optic that includes a transmissive holographic optic and a beam splitter, in accordance with an embodiment of the disclosure.

FIG. 7A depicts a top cross-section view of an example optical combiner 700 including a display module 705, a light relay 765, a planar mirror 784 and SHOs 731, 732, and 733, in accordance with an embodiment of the disclosure. As discussed above, holograms can be configured to operate as reflective and transmissive holograms. FIG. 7B illustrates an example SHO (e.g. 731, 732, or 733) that includes a switchable transmissive holographic optic 737 and a beam splitter 739, in accordance with an embodiment of the disclosure.

In operation, display module 705 launches display light along forward propagating path 780. The display light encounters SHO 731 along forward path 680. In the illustrated embodiment, SHO 731 is angle-tuned to collimate a first spectrum (if it has singular selectivity) or multiple spectrums (if it has plural selectivity) of display light propagating along forward path 780, when SHO 731 is activated. If SHO 731 is activated, it collimates the selected spectrum(s) of display light, which then encounters beam splitter 739 which reflects a percentage of the display light toward the external scene side of optical combiner 700. The non-reflected collimated display light continues toward planar mirror 784. The non-reflected collimated display light may encounter SHOs 732 and 733. If deactivated, the transmissive switchable holographic optic 737 of SHO 732 and 733 will appear essentially transparent to the collimated display light. However, because SHO 732 and 733 also include a beam splitter 739, some percentage of the non-reflected collimated display light will be reflected out the external scene side of optical combiner 700. The collimated display light that is not reflected out of optical combiner 700 will continue along forward path 780. After planar mirror 784 reflects the collimated display light, the collimated display light continues along reverse path 785. The collimated display light propagating along reverse path 785 will again lose a percentage of the display light due to the beam splitters 739 included in SHO 732 and 733. When the collimated display light eventually reaches SHO 731, it will be reflected toward eye 160 in a first image region as image 775. Of note, since SHO 731 already collimated the display light, a collimating mirror is not necessarily needed to collimate the display light to improve the readability of the user.

To project image 776 in the second image region seen by eye 160, SHO 732 is activated. To project image 777 in the third image region seen by eye 160, SHO 733 is activated. It is appreciated that controller 450 may selectively activate each SHO 731, 732, and 733 in coordination with instructing display module to display images 775, 776, and 777 to synchronize the SHOs with projected images. As discussed above, the images may be cycled at a speed fast enough such that the user perceives three persistent images due to the light integration time of the human eye.

Figure 8:
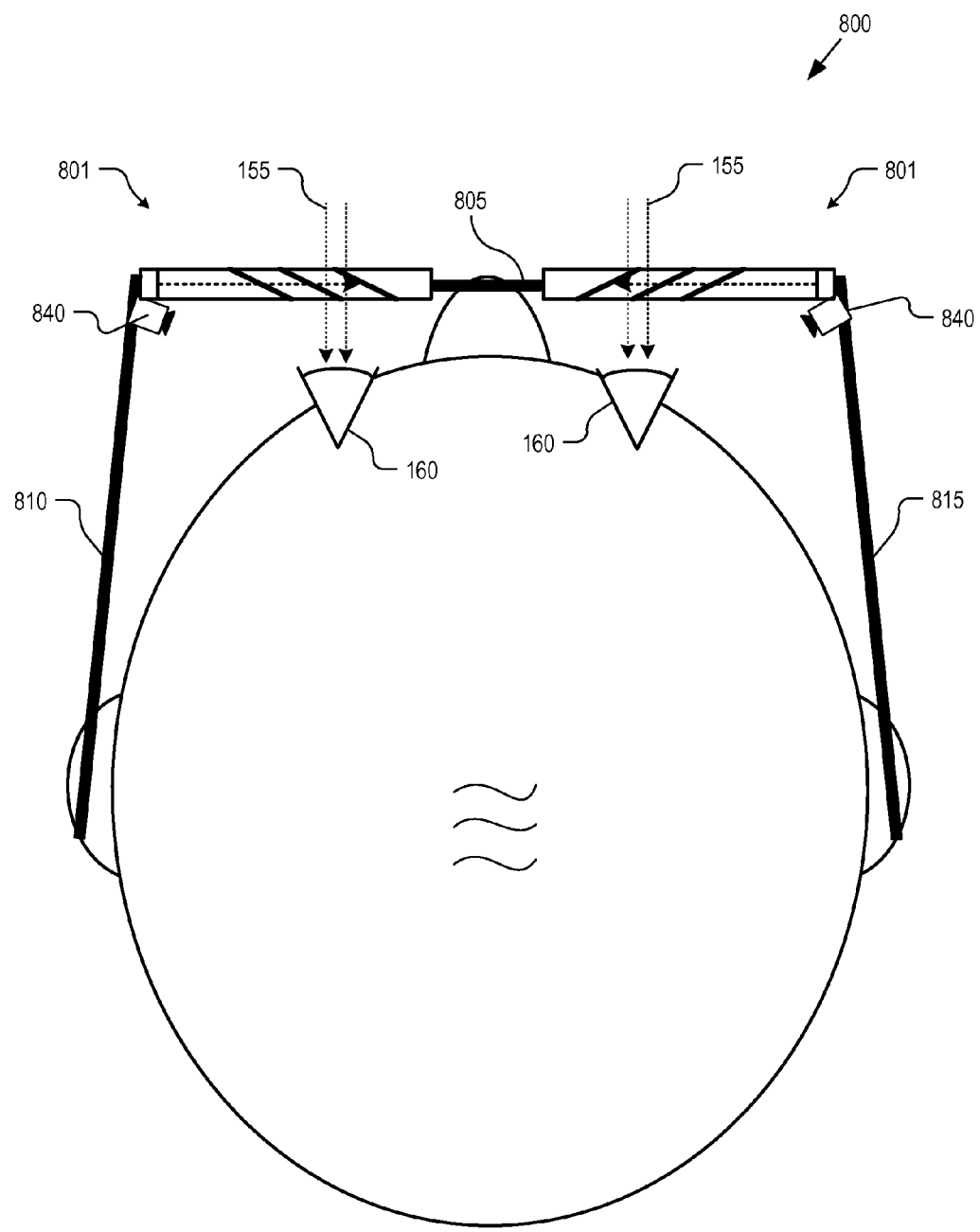
FIG. 8 depicts a top view of a user wearing a binocular head mounted display that includes optical combiners, in accordance with an embodiment of the disclosure.

FIG. 8 depicts a top view of a user wearing a binocular HMD 800 that includes optical combiners, in accordance with an embodiment of the disclosure. Each optical combiner 801 may be implemented with an embodiment of optical combiners 200, 300, 500, 600, or 700. The optical combiners 801 are mounted to a frame assembly, which includes a nose bridge 805, left ear arm 810, and right ear arm 815. Although FIG. 8 illustrates a binocular embodiment, HMD 800 may also be implemented as a monocular HMD that includes only one optical combiner 801. The optical combiners can also be integrated in a non-planar substrate, in order to provide a more suitable glass like form for zero diopter viewing, and also for prescription glass viewing (the prescription being implemented by the combination of curved surfaces forming the non planar surface. The holograms can be sandwiched in a planar substrate in the non-planar lens like material, or can be inserted in front or in the back of the lens like substrate.

In the illustrated embodiment, the optical combiners 801 are secured into an eyepiece arrangement that can be worn on the head of a user. The left and right ear arms 810 and 815 rest over the user's ears while nose assembly 805 rests over the user's nose. The frame assembly is shaped and sized to position each optical combiner 801 in front of a corresponding eye 160 of the user. Of course, other frame assemblies having other shapes may be used (e.g., a visor with ear arms and a nose bridge support, a single contiguous headset member, a headband, goggles type eyewear, etc.).

The illustrated embodiment of HMD 800 is capable of displaying an augmented reality to the user. Each optical combiner 801 may permit the user to see a real world image via external scene light 155 in additional to display light (having CGI) from a display module. In this case, optical combiners 801 may present both external scene light and computer generated display light to the eye 160 of a user. As a result, the display light may be seen by the user as a virtual image superimposed over the real world as an augmented reality. In some embodiments, external scene light 155 may be blocked or selectively blocked to provide sun-shading characteristics and increase the contrast of the display light.

In the embodiments of this disclosure (e.g. 300, 500, 600, and 700) that may include a controller (e.g. controller 450), the controller may be disposed within left ear arm 810 or right ear arm 815, although it is not illustrated in FIG. 8. In embodiments that utilize an eye-tracking module, eye-tracking module 880 may be positioned to image eye 160. In FIG. 8, eye-tracking modules 880 are placed in example locations in HMD 800, in accordance with one embodiment of the disclosure. In other examples, one eye tracking module 880 or multiple eye-tracking modules may be placed in other positions to image eye 160.

Some embodiments (e.g. 200, 300, 500, 600, and 700) of the disclosed optical combiners may offer a potential advantage of displaying more information (in a larger FOV) than in some embodiments. Furthermore, embodiments 200 and 300 may not require an end reflector, which may decrease cost and reduce size and weight.

It is appreciated that the depicted embodiments in FIGS. 2A through 7B illustrate three holographic optics or switchable optics included in the light relay. However, it appreciated that the teaching of the disclosure may also be applied to having two holographic optic or switchable optics included in a light relay. It is also appreciated that four or more holographic optics or switchable optics may be included in a light relay in accordance with the teachings of the disclosure.

Furthermore, it is appreciated that in the holographic embodiments that incorporate Bragg selectivity, the specified optics may be configured to be "on Bragg" for the specific wavelengths of lights emitted by light sources of the display module. Therefore, if the display module has a red, a green, and a blue light source, the holographic Bragg selectivity may be tuned to the specific wavelengths of the light source to increase the efficiency of optical combiner by directing a larger portion of the total display light to the eye. Additionally, using a holographic optics may be more efficient than using beam splitters because beam splitters necessarily reflect some percentage of the display light while holographic optics may be configured to utilize a greater portion of the display light for directing to the eye.

In addition to directing images (e.g. 275, 276, and 277) into eye 160, the optical combiners discussed in this disclosure also allows at least a portion of external scene light 155 to reach eye 160 because the holographic optics (whether activated or deactivated) may not be configured to influence (e.g. selectively reflect or transmit) light coming from the same angle as scene light 155. Consequently, one potential advantage of using holographic optics is that the holographic optics included in the light relays may not substantially affect the user's perception of external scene light 155, as opposed to some optical combiners where external scene light 155 may be reduced or color shifted due to filters and beam splitting optics included in the light relay.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for a head mounted display ("HMD"), the apparatus comprising:
    a display module for launching display light along a forward propagating path;
    a light relay optically coupled to receive the display light, wherein the light relay includes:
        a first switchable holographic optic ("SHO") disposed along the forward propagating path;
        a second SHO disposed along the forward propagating path between the first SHO and the display module; and
        a third SHO disposed along the forward propagating path between the first SHO and the second SHO; and
    a controller coupled to selectively activate the first SHO, the second SHO, and the third SHO, wherein the first SHO is configured to direct at least a first portion of the display light toward an eye-ward side of the light relay when the first SHO is activated by the controller, and wherein the second SHO is configured to direct at least a second portion of the display light toward the eye-ward side of the light relay when the second SHO is activated by the controller, and further wherein the third SHO is configured to direct at least a third portion of the display light toward the eye-ward side of the light relay when the third SHO is activated by the controller,
    wherein the first SHO includes a first holographic medium written with a first, second, and third Bragg selectivity to cause a first, second, and third spectrum of the display light to be collimated and reflected toward the eye-ward side of the light relay when the first SHO is activated by the controller,
    and wherein the second SHO includes a second holographic medium written with the first, second, and third Bragg selectivity to cause the first, second, and third spectrum of the display light to be collimated and reflected toward the eye-ward side of the light relay when the second SHO is activated by the controller,
    and wherein the third SHO includes a third holographic medium written with the first, second, and third Bragg selectivity to cause the first, second, and third spectrum of the display light to be collimated and reflected toward the eye-ward side of the light relay when the third SHO is activated by the controller.

2. The apparatus of claim 1, wherein the controller is also coupled to the display module to coordinate the launching of the display light with selectively activating the first and second SHOs.

3. The apparatus of claim 1 further comprising an eye-tracking module positioned to monitor an eye to be brought in proximity to the eye-ward side of the light relay, wherein the controller is coupled receive gaze data generated by the eye-tracking module and coupled to selectively activate the first and second SHGs in responsive to the gaze data generated by the eye-tracking module.

4. The apparatus of claim 1, wherein a light source of the display module includes:
- a first light source that emits the first spectrum of the display light;
- a second light source that emits the second spectrum of the display light; and
- a third light source that emits the third spectrum of the display light.

5. The apparatus of claim 1, wherein the first SHO includes first holographic polymer-dispersed liquid crystals ("H-PDLC") and the second SHO includes second H-PDLC.

6. The apparatus of claim 1, wherein the display module include a liquid crystal on silicon ("LCOS") display.

7. The apparatus of claim 1 further comprising a frame assembly for wearing on a head of a user, wherein the display module is mounted to the frame assembly.

8. An apparatus for a head mounted display ("HMD"), the apparatus comprising:
- a display module for launching display light along a forward propagating path;
- an end reflector positioned to reflect back the display light along a reverse propagating path, wherein the end reflector includes a planar mirror;
- a light relay disposed between the display module and the end reflector, wherein the light relay includes:
  - a first switchable optic disposed along the forward propagating path, wherein the first switchable optic includes a first switchable holographic optic and a first beam splitter; and
  - a second switchable optic disposed along the forward propagating path between the first switchable optic and the display module, wherein the second switchable optic includes a second switchable holographic optic and a second beam splitter, the first and second beam splitters facing the planar mirror; and
- a controller coupled to selectively activate the first and second switchable optics, wherein the first switchable optic is configured to direct the display light propagating along the reverse propagating path toward an eye-ward side of the light relay when the first switchable optic is activated by the controller, and wherein the first switchable holographic optic is configured to substantially collimate the display light propagating along the forward propagating path when the first switchable optic is activated by the controller and to appear essentially transparent to the display light propagating along the forward propagating path when the first switchable optic is not activated by the controller,
- and wherein the second switchable optic is configured to direct the display light propagating along the reverse propagating path toward the eye-ward side of the light relay when the second switchable optic is activated by the controller, the second switchable holographic optic further configured to substantially collimate the display light propagating along the forward propagating path when the second switchable optic is activated by the controller and to appear essentially transparent to the display light propagating along the forward propagating path when the second switchable optic is not activated by the controller.

9. The apparatus of claim 8, wherein the controller is also coupled to the display module to coordinate the launching of the display light with selectively activating the first and second switchable optics.

10. The apparatus of claim 8, wherein the end reflector is optically configured to receive the display light propagating along the forward propagating path and reflect the display light as substantially collimated display light propagating along the reverse propagating path.

11. The apparatus of claim 8, wherein the first switchable holographic optic includes first holographic polymer-dispersed liquid crystals ("H-PDLC") and the second switchable holographic optic includes second H-PDLC.

12. The apparatus of claim 8 further comprising a frame assembly for wearing on a head of a user, wherein the display module is mounted to the frame assembly.

* * * * *